US008400659B2

(12) United States Patent
Sasaki

(10) Patent No.: US 8,400,659 B2
(45) Date of Patent: Mar. 19, 2013

(54) IMAGE FORMING APPARATUS WITH DEDICTATED TRANSMISSION LINE THAT CONNECTS THE CONTROL UNIT AND THE ENGINE UNIT AND FEATURES A POWER MODE SIGNAL

(75) Inventor: Jun Sasaki, Tokyo (JP)

(73) Assignee: Ricoh Company, Limited, Tokyo (JP)

( * ) Notice: Subject to any disclaimer, the term of this patent is extended or adjusted under 35 U.S.C. 154(b) by 780 days.

(21) Appl. No.: 12/545,411

(22) Filed: Aug. 21, 2009

(65) Prior Publication Data

US 2010/0067043 A1 Mar. 18, 2010

(30) Foreign Application Priority Data

Sep. 17, 2008 (JP) ................................ 2008-238678

(51) Int. Cl.
*G06F 3/12* (2006.01)

(52) U.S. Cl. ..................... 358/1.15; 358/1.13; 358/1.14; 358/1.9; 358/1.1; 710/100; 710/105

(58) Field of Classification Search ........................ None
See application file for complete search history.

(56) References Cited

U.S. PATENT DOCUMENTS 5,828,462 A * 10/1998 Hashimoto et al. ........... 358/296
2007/0014586 A1 1/2007 Kobayashi
2008/0075498 A1 3/2008 Kojo
2008/0133808 A1* 6/2008 Fukunaga ..................... 710/106

FOREIGN PATENT DOCUMENTS

GB 2 282 991 A 4/1995
JP 11-187162 7/1999
JP 2001-331057 11/2001
JP 2002-218099 8/2002
JP 2002-268441 9/2002
JP 2003-223068 8/2003
JP 2004-42639 2/2004
JP 2005-5015 1/2005
JP 2006-38916 2/2006
JP 2006-237734 9/2006
JP 2007-160602 6/2007
JP 2008-70609 3/2008
JP 2008-211761 9/2008

OTHER PUBLICATIONS

Machine translation of Japanese Office Action dated Oct. 30, 2012 for Japanese Pat. Appl. No. 2008-234678 to Sasaki, filed on Sep. 17, 2008.*
Extended Search Report issued Dec. 10, 2010, in European Patent Application No. 09168698.0-1240/2166415.
Office Action mailed Oct. 30, 2012, in Japanese Application No. 2008-238678.

* cited by examiner

*Primary Examiner* — Benny Q Tieu
*Assistant Examiner* — Paul F Payer
(74) *Attorney, Agent, or Firm* — Oblon, Spivak, McClelland, Maier & Neustadt, L.L.P.

(57) ABSTRACT

In an MFP, a system controller is connected to an engine via a universal transmission line and a dedicated transmission line. When MFP is powered, the system controller sends a mode signal to the engine via the dedicated signal line. If the mode signal indicates that the power mode is to be set to a normal mode, the engine activates predetermined components. The system controller and the engine then establish communication via the universal bus. After establishing the communication, if the mode signal indicates that the power mode is to be set to a mode other than the normal mode, the system controller sends a setting command to the engine via the bus to set the power mode to any of a plurality of power-saving modes.

8 Claims, 3 Drawing Sheets

IMAGE FORMING APPARATUS WITH DEDICTATED TRANSMISSION LINE THAT CONNECTS THE CONTROL UNIT AND THE ENGINE UNIT AND FEATURES A POWER MODE SIGNAL

CROSS-REFERENCE TO RELATED APPLICATIONS

The present application claims priority to and incorporates by reference the entire contents of Japanese Patent Application No. 2008-238678 filed in Japan on Sep. 17, 2008.

BACKGROUND OF THE INVENTION

1. Field of the Invention

The present invention relates to an image forming apparatus that has a normal mode in which power is supplied to every component in the image forming apparatus and a power-saving mode in which power is supplied to only some of the components in the image forming apparatus.

2. Description of the Related Art

Devices with low-power consumption are in demand; therefore, research has been conducted in the field of image forming apparatuses, such as facsimile machines, printers, and copiers, into saving power when the apparatuses are on standby, for example, standby for receiving, standby for copying, and standby for printing.

Various solutions offering power savings are widely used in image forming apparatuses. These solutions include, from the mechanical viewpoint, stopping mechanical processes completely during standby situations and, from the electrical viewpoint, shifting from normal mode to power-saving mode, in which power is supplied only to essential logic circuits.

In addition to power saving, there has also been a demand to decrease a reset time of image forming apparatuses. The reset time is a time that an image forming apparatus takes to shift from power-saving mode to normal mode. Japanese Patent Application Laid-open No. 2006-38916 discloses a technology that forms an image on a recording sheet in such a manner that the maximum amount of toner forming the image is set smaller than usual. Using this technology makes it possible to prevent fixing failures and decrease the reset time, which leads to both power saving and improved productivity.

In the image forming apparatus disclosed in Japanese Patent Application Laid-open No. 2006-38916, a controller and an engine are connected to each other via a universal bus that establishes communication between the controller and the engine. In this configuration, when the image forming apparatus is powered, it is necessary to first establish communication between the controller and the engine via the universal bus and then send a mode-shift command from the controller to the engine before the engine shifts the power mode from power-saving mode to normal mode. However, this process lengthens the reset time. There is a need to shorten the reset time.

SUMMARY OF THE INVENTION

It is an object of the present invention to at least partially solve the problems in the conventional technology.

According to an aspect of the present invention, there is provided an image forming apparatus including a control unit configured to control operations of the image forming apparatus; an engine unit configured to perform image formation under control of the control unit; a universal transmission line that connects the control unit and the engine unit so that communication between the control unit and the engine unit can be established and data can be transferred between the control unit and the engine unit; and a dedicated transmission line that connects the control unit and the engine unit so that data can be transferred between the control unit and the engine unit even when communication has not been established between the control unit and the engine unit. When the image forming apparatus is powered, the control unit sends a mode signal to the engine unit via the dedicated transmission line, wherein the mode signal is a signal indicative of whether a power mode is to be set to a normal mode where power is supplied to every component of the image forming apparatus. Upon receiving the mode signal from the control unit via the dedicated transmission line, if the mode signal indicates that the power mode is to be set to the normal mode, the engine unit activates predetermined components in the image forming apparatus, the control unit and the engine unit establish communication via the universal transmission line, after establishment of the communication, if the mode signal indicates that the power mode is to be set to a mode other than the normal mode, the control unit sends a setting command to the engine unit via the universal transmission line to set the power mode to a power-saving mode that is specified from among a plurality of power-saving modes where power is supplied to only some components of the image forming apparatus. Upon receiving the setting command from the control unit via the universal transmission line, the engine unit activates a part of the image forming apparatus so that the image forming apparatus switches to the power-saving mode that is specified by the setting command.

According to another aspect of the present invention, there is provided an image forming apparatus includes control means configured to control operations of the image forming apparatus; engine means configured to perform image formation under control of the control means; a universal transmission line that connects the control means and the engine means so that communication between the control means and the engine means can be established and data can be transferred between the control means and the engine means; and a dedicated transmission line that connects the control means and the engine means so that data can be transferred between the control means and the engine means even when communication has not been established between the control means and the engine means. When the image forming apparatus is powered, the control means sends a mode signal to the engine means via the dedicated transmission line, wherein the mode signal is a signal indicative of whether a power mode is to be set to a normal mode where power is supplied to every component of the image forming apparatus. Upon receiving the mode signal from the control means via the dedicated transmission line, if the mode signal indicates that the power mode is to be set to the normal mode, the engine means activates predetermined components in the image forming apparatus, the control means and the engine means establish communication via the universal transmission line, after establishment of the communication, if the mode signal indicates that the power mode is to be set to a mode other than the normal mode, the control means sends a setting command to the engine means via the universal transmission line to set the power mode to a power-saving mode that is specified from among a plurality of power-saving modes where power is supplied to only some components of the image forming apparatus. Upon receiving the setting command from the control means via the universal transmission line, the engine means activates a part of the image forming apparatus so that the image forming apparatus switches to the power-saving mode that is specified by the setting command.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are described in detail below with reference to the accompanying drawings. An image forming apparatus according to an embodiment of the present invention is a multifunction peripheral (MFP) having various functions as a copier, a facsimile machine, and a printer. However, some other image forming apparatuses can be used, instead.

Figure 1:
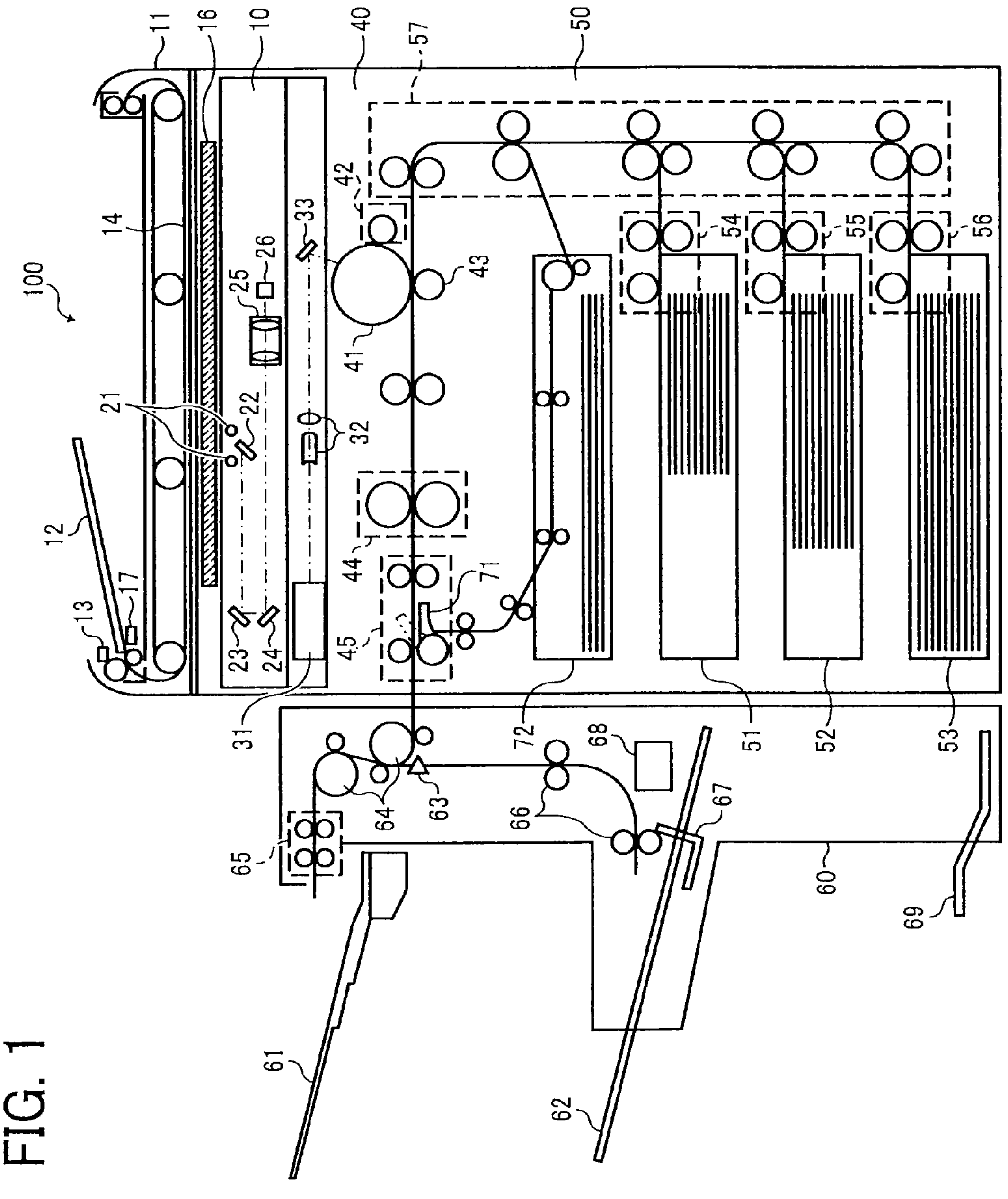
FIG. 1 is a schematic side view of an internal configuration of a multifunction peripheral (MFP) according to an embodiment of the present invention.

FIG. 1 is a schematic side view of an internal configuration of an MFP 100 according to an embodiment of the present invention. The MFP 100 includes a scanner engine 10, a plotter engine 40, a paper feed unit 50, and a paper discharging unit 60.

The scanner engine 10 scans an image from an original that is placed in a predetermined manner. The scanner engine 10 includes an automatic document feeder (ADF) 11, a document tray 12, a feeding roller 13, a feeding belt 14, an exposure glass 16, and a sensor 17 that detects whether the original is set. The scanner engine 10 includes an optical scanning system. The optical scanning system includes an exposure lamp 21, a first mirror 22, a second mirror 23, a third mirror 24, a lens 25, and a charge coupled device (CCD) image sensor 26. The exposure lamp 21 and the first mirror 22 are mounted on a first carriage (not shown) in a fixed manner. The second mirror 23 and the third mirror 24 are mounted on a second carriage (not shown) in a fixed manner.

Several reflection-type size sensors (not shown) are arranged under the exposure glass 16. The size of the original that is placed on the exposure glass 16 can be detected by a combination of information output from the size sensors. The scanner engine 10 includes a laser output unit 31, an imaging lens 32, and a reflecting mirror 33. The laser output unit 31 includes a laser diode as a laser source and a polygon mirror that is rotated by a motor at a high and constant speed.

The MFP 100 includes a storage unit in which image data that is converted by the CCD image sensor 26 is temporarily stored. The image data is then read from the storage unit to modulate a laser light that is emitted from the laser diode. The modulated laser light is deflected by the constantly rotating polygon mirror. The deflected light passes through the imaging lens 32 and travels to the reflecting mirror 33. The reflecting mirror 33 reflects the received light so that the reflected light focuses onto a photosensitive element 41 of the plotter engine 40.

The plotter engine 40 includes the photosensitive element 41, a developing unit 42, a transferring unit 43, a fixing unit 44, and a conveyer unit 45. The surface of the photosensitive element 41 is charged with a high potential by a charger (not shown). The surface of the photosensitive element 41 is scanned in a direction perpendicular to a direction in which the photosensitive element 41 rotates (hereinafter, "main-scanning direction") with the laser light that is deflected by the polygon mirror. The scanning in the main-scanning direction is repeated at cycles determined by a speed at which the photosensitive element 41 rotates and a recording density. Because the potential of an exposed area changes depending on an intensity of the laser light, an electrostatic latent image corresponding to the density distribution of the original image is formed on the photosensitive element 41. The developing unit 42 develops the electrostatic latent image into a toner image. The transferring unit 43 transfers the toner image onto a recording sheet that is conveyed from the paper feed unit 50.

The paper feed unit 50 includes a first tray 51, a second tray 52, a third tray 53, a first feeding unit 54, a second feeding unit 55, a third feeding unit 56, and a vertically conveying unit 57. When the size of the recording sheet is specified by a user, the corresponding tray is selected from among the first tray 51, the second tray 52, and the third tray 53. A recording sheet having the specified size is then fed from the selected tray by the corresponding feeding unit. The recording sheet is then conveyed to the transferring unit 43, passed through the vertically conveying unit 57. After the toner image is transferred onto the recording sheet by the transferring unit 43, the recording sheet is conveyed to the fixing unit 44. The fixing unit 44 includes a heat roller and a pressure roller (not shown). The heat roller is heated by a heater (not shown) before the recording sheet is conveyed to the fixing unit 44. When the recording sheet with the toner image passes between the heat roller and the pressure roller, the toner is melted and fixed by heat to the recording sheet. The recording sheet with the fixed toner image is then conveyed by the conveyer unit 45 to the paper discharging unit 60.

The paper discharging unit 60 includes a discharge tray 61 that receives the discharged recording sheet, a staple tray 62, an alignment jogger 67, a stapler 68, and a stapled-sheet discharge tray 69. After conveyed by the conveyer unit 45, if a switching plate 63 turns downward, the recording sheet is conveyed to the discharge tray 61 passed through conveyer rollers 64 and 65. If the switching plate 63 turns upward, the recording sheet is conveyed to the staple tray 62 passed through a conveyer roller 66. In the latter case, the recording sheets are conveyed onto the staple tray 62 and then aligned by the alignment jogger 67 one by one. When the last one of a set of the recording sheets is aligned, the set of the recording sheets is stapled by the stapler 68. The stapled recording sheets fall down by its weight to the stapled-sheet discharge tray 69. The discharge tray 61 is movable in a direction perpendicular to the sheet conveying direction. Therefore, the recording sheets can be stacked on the discharge tray 61 easily in a sorted manner by the movement of the discharge tray 61.

In duplex printing, after an image is formed on a first side of the recording sheet that is fed from one of the first tray 51, the second tray 52, and the third tray 53, the recording sheet is reversely conveyed to a duplex-printing feeding unit 72 by the operation of a switching claw 71 turned upward without conveyed toward the discharge tray 61 and temporarily stacked in the duplex-printing feeding unit 72. After that, the recording sheet is conveyed from the duplex-printing feeding unit 72 to the plotter engine 40. The series of processes including formation of an electrostatic latent image, development, transfer, and fixing are then performed. The switching claw 71 is turned downward, and the recording sheet with images on both sides is conveyed toward the discharge tray 61.

Figure 2:
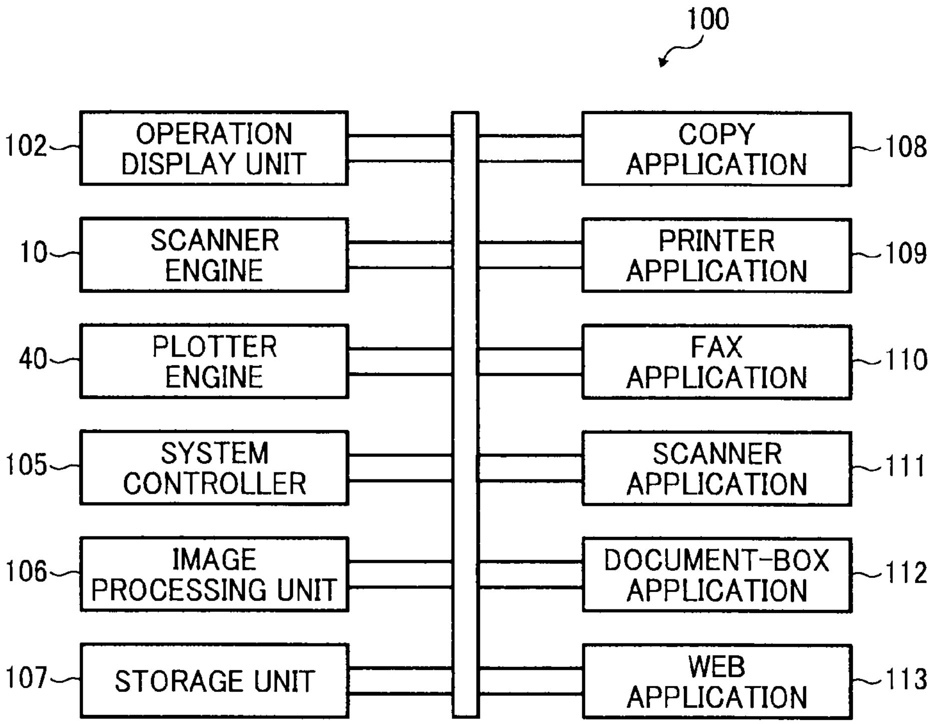
FIG. 2 is a functional block diagram of the MFP illustrated in FIG. 1.

The functional configuration of the MFP 100 is described below by using FIG. 2. The MFP 100 includes an operation display unit 102, the scanner engine 10, the plotter engine 40, a system controller 105, an image processing unit 106, a storage unit 107, a copy application 108, a printer application 109, and a facsimile (FAX) application 110, a scanner application 111, a document-box application 112, and a web application 113.

The operation display unit 102 includes a liquid crystal display (LCD) and an operation unit. The operation unit receives various instructions form the user when the user presses operation keys. The LCD includes a light emitting diode (LED), and displays various screens. The operation display unit 102 receives various instructions form the user when the user touches a screen appearing on the LCD.

The scanner engine 10 scans the original, which is placed in a predetermined manner by the user, using the CCD image sensor 26 (see FIG. 1) under specified conditions. The specified conditions include, for example, the magnifying factor, the resolution, and the color.

The image processing unit 106 creates print data that is used for printing (recording) by the plotter engine 40 from the image data that is acquired by the scanner engine 10.

The plotter engine 40 prints an image on a recording medium, such as a paper sheet, based on the print data that is created by the image processing unit 106.

The storage unit 107 is storage medium such as a temporal memory. The storage unit 107 stores therein, for example, the image data that is acquired by the scanner engine 10 and the print data that is created by the image processing unit 106.

The copy application 108 is used for copying. The printer application 109 is used for printing. The FAX application 110 is used for facsimile. The scanner application 111 is used to scanning. The document-box application 112 is used to save various data in a hard disk drive (HDD). The web application 113 is used to implement functions as a web server using a hypertext transfer protocol (HTTP).

The system controller 105 controls the above-described units and applications included in the MFP 100. The system controller 105, for example, uses the copy application 108, the scanner application 111, or the FAX application 110 to cause the scanner engine 10 to scan the original. Moreover, the system controller 105, upon receiving a request from the printer application 109 or the copy application 108, causes the image processing unit 106 to create the print data, the plotter engine 40 to print the print data, or writes/reads various data to/from the storage unit 107.

The system controller 105 sets the power mode of the MFP 100 to either a normal mode or a power-saving mode. In the normal mode, the power is supplied to every component included in the MFP 100. In the power-saving mode, the power is supplied to only a part of the MFP 100.

The power mode of the MFP 100 is described below. There are various sub-modes in the normal mode and the power-saving mode. For example, the normal mode includes a standby mode. In the standby mode, every component is supplied with power and the MFP 100 is ready to copy or print.

The power-saving mode includes a preheating mode, a low-power mode, and a silent mode. In the preheating mode, the temperature of the fixing unit 44 (see FIG. 1) is set lower than the fixing temperature in the normal mode. The operation display unit 102 can be turned OFF in the preheating mode.

In the low-power mode, the fixing unit 44 is turned OFF or the temperature of the fixing unit 44 is set lower than the temperature in the preheating mode. The scanner engine 10, the plotter engine 40, and the finisher (the paper discharging unit, see FIG. 1) can be turned OFF in the low-power mode.

The silent mode is used to receive FAX data using the FAX application 110 or activate the web application 113 during nighttime. The scanner engine 10, the plotter engine 40, the finisher, and the like are not activated in the silent mode.

The scanner engine 10, the plotter engine 40, and the finisher are turned OFF in the power-OFF mode.

The connection between the system controller 105 and an engine 200 of the MFP 100 is described in detail below.

Figure 3:
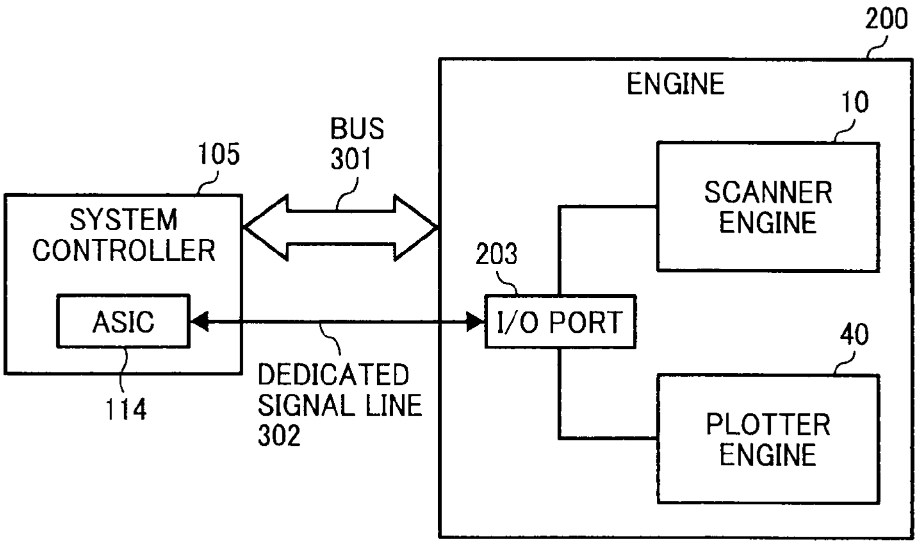
FIG. 3 is a block diagram that explains connection between a system controller and an engine included in the MFP.

FIG. 3 is a block diagram that explains connection between the system controller 105 and the engine 200.

The system controller 105 includes an application specific integrated circuit (ASIC) 114. The engine 200 performs image formation under control of the system controller 105. The engine 200 includes the scanner engine 10, the plotter engine 40, and an input/output (I/O) port 203. The system controller 105 and the engine 200 are connected via a bus 301 and a dedicated signal line 302. The bus 301 is, for example, a universal bus.

The ASIC 114 is an integrated circuit that includes various circuits to implement a specific application. The ASIC 114 transfers data between the system controller 105 and the engine 200 when the ASIC 114 is connected to the I/O port 203 via the dedicated signal line 302.

The I/O port 203 is a connecting member that connects a peripheral device and the dedicated signal line 302 so that data can be transferred between the system controller 105 and the peripheral device. The ASIC 114 has an I/O port (not shown) and the dedicated signal line 302 connects the I/O port 203 to the I/O port of the ASIC 114. Thus, data about the scanner engine 10 and the plotter engine 40 can be transferred via both the dedicated signal line 302 and the bus 301 between the system controller 105 and the engine 200.

The bus 301 connects the system controller 105 and the engine 200. The communication between the system controller 105 and the engine 200 is established via the bus 301. After the communication is established, various data is transferred via the bus 301. In other words, data cannot be transferred via the bus 301 until the communication between the system controller 105 and the engine 200 is established.

The dedicated signal line 302 connects the system controller 105 and the engine 200. Various data can be transferred via the dedicated signal line 302 whether or not communication between the system controller 105 and the engine 200 has been established. In other words, data can be transferred via the dedicated signal line 302 even when the communication between the system controller 105 and the engine 200 is not established.

The dedicated signal line 302 includes, although not shown specifically, a first signal line, a second signal line, and a third signal line. The first signal line conveys a mode signal from the system controller 105 to the engine 200 to set the MFP 100 to the normal mode. The second signal line conveys the mode signal from the system controller 105 to the engine 200 to set the MFP 100 to any of the power-saving modes. The third signal line conveys a state signal indicative of a state of the engine 200 from the engine 200 to the system controller 105.

When the MFP 100 is powered, the system controller 105 determines, using a signal that is received via the dedicated signal line 302, whether the power mode is set to be the normal mode. The system controller 105 then sends the result of the determination to the engine 200 via the dedicated signal line 302 as the mode signal.

Upon receiving a state signal from the engine 200 via the dedicated signal line 302 indicating that the engine 200 is ready to establish the communication with the system controller 105 via the bus 301, the system controller 105 starts a process for establishing communication with the engine 200 via the bus 301. As a result, communication is established between the system controller 105 and the engine 200 via the bus 301.

When the system controller 105 determines that the power mode is to be set to a mode other than the normal mode, the system controller 105 sends, after the communication with the engine 200 via the bus 301 is established, a command to set the power mode to a specified one of the power-saving modes to the engine 200 via the bus 301.

Upon receiving the mode signal from the system controller 105 via the dedicated signal line 302, if the system controller 105 determined that the power mode is to be set to the normal mode, the engine 200 activates the fixing unit 44, the components in the process system including the scanner lamp, the components in the optical system. Upon receiving the mode signal, if the system controller 105 determined that the power mode is set to a mode other than the normal mode, the engine 200 does not activates any components in the MFP 100.

The engine 200 performs a mode setting process based on the mode indicated by the mode signal that is received from the system controller 105 via the dedicated signal line 302. Upon completion of the mode setting process, when the engine 200 is in a state to start the process for establishing the communication with the system controller 105 via the bus 301, the engine 200 sets the third signal line of the dedicated signal line 302 to a "ready state" and sends the state signal to the system controller 105 indicating that the engine 200 is ready.

Upon receiving a state signal from the engine 200 indicating that the engine 200 is ready, the system controller 105 establishes the communication with the engine 200 via the bus 301. As a result, the communication is established between the system controller 105 and the engine 200 via the bus 301.

Upon receiving the command to set the power mode to the specified one of the power-saving modes from the system controller 105 via the bus 301 after the communication between the system controller 105 and the engine 200 is established, the engine 200 activates certain components so that the MFP 100 is turned to the specified power-saving mode. More particularly, for example, if the specified power-saving mode is the preheating mode, the engine 200 sets the temperature of the fixing unit 44 to low and activates the plotter engine 40. If the specified power-saving mode is the silent mode, the engine 200 activates neither the scanner engine 10 nor the plotter engine 40.

The mode setting process is described in detail below.

Figure 4:
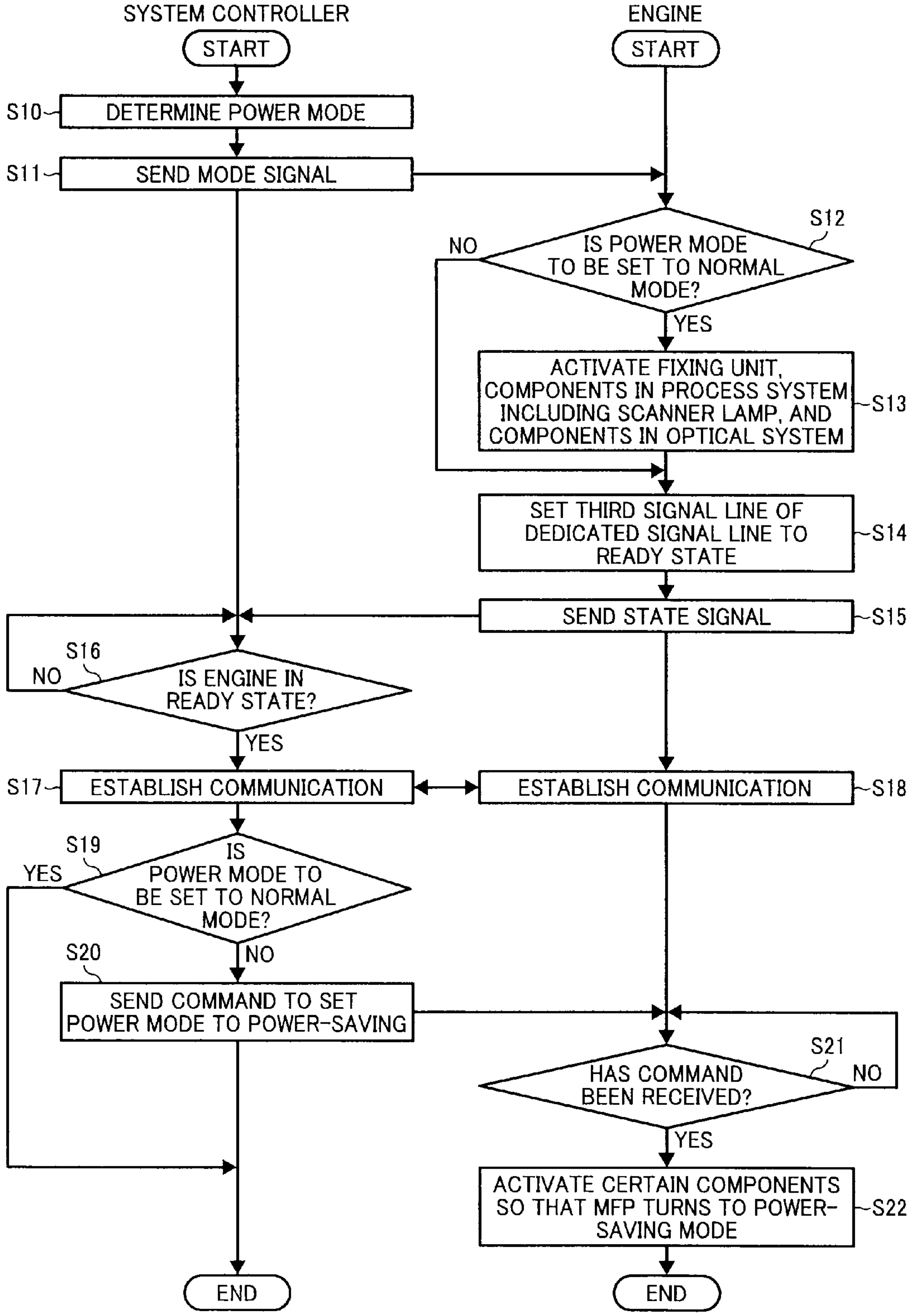
FIG. 4 is a flowchart of a mode setting process performed by the system controller and the engine according to the embodiment.

FIG. 4 is a flowchart of the mode setting process performed by the system controller 105 and the engine 200.

When the MFP 100 is powered, the system controller 105 determines using the signal that is received via the dedicated signal line 302 whether the power mode is to be set to normal mode (Step S10), and generate a mode signal indicative of the power mode to be set. The phrase "the MFP 100 is powered" is used in various situations, for example, a situation where all the components of the MFP 100 is turned from power-OFF to power-ON and a situation where the power is supplied to the MFP 100 that is in, for example, the silent mode in which the scanner engine 10 and the plotter engine 40 are not activated.

The system controller 105 then sends the mode signal to the engine 200 via the dedicated signal line 302 (Step S11). The engine 200 sets the power mode based on the mode indicated by the mode signal.

Upon receiving the mode signal from the system controller 105 via the dedicated signal line 302, the engine 200 determines the mode indicated by the received mode signal is the normal mode (Step S12). If the mode indicated by the received mode signal is the normal mode (Yes at Step S12), the engine 200 activates the fixing unit 44, the components in the process system including the scanner lamp, and the components in the optical system (Step S13). If the mode indicated by the received mode signal is other than the normal mode (No at Step S12), the engine 200 does not activate any components.

When the engine 200 enters into a ready state, the engine 200 sets the third signal line to a ready state (Step S14) and sends a state signal indicative of the ready state of the engine 200 to the system controller 105 via the dedicated signal line 302 (Step S15).

After sending the mode signal to the engine 200, the system controller 105 monitors whether the engine 200 has entered into the ready state (Step S16). If the engine 200 has not entered into the ready state (No at Step S16), the system controller 105 waits until the engine 200 enters into the ready state. Upon receiving the state signal indicating that the engine 200 is in the ready state from the engine 200, the system controller 105 determines that the engine 200 has entered into the ready state (Yes at Step S16).

Upon receiving the state signal indicating that the engine 200 is in the ready state from the engine 200, the system controller 105 starts the process for establishing the communication with the engine 200 via the bus 301. Thus, the system controller 105 and the engine 200 establish the communication between them via the bus 301 (Steps S17 and S18).

After establishing the communication with the engine 200 via the bus 301, when the mode signal sent from the system controller 105 to the engine 200 via the dedicated signal line 302 indicates that the power mode is to be set to the normal mode (Step S19). If the power mode is to be set to the normal mode (Yes at Step S19), the process control goes to end. If the power mode is to be set to a power mode other than the normal mode (No at Step S19), the system controller 105 sends to the engine 200 via the bus 301 the command to set the power mode to the specified power-saving mode (Step S20).

After establishing the communication with the system controller 105 via the bus 301, the engine 200 determines whether the command to set the power mode to the specified power-saving mode has been received from the system controller 105 via the bus 301 (Step S21). If no command has been received (No at Step S21), the engine 200 waits until the command is received from the system controller 105. Upon receiving the command from the system controller 105 (Yes at Step S21), the engine 200 activates certain components of the MFP 100 so that the MFP 100 turns to the specified power-saving mode (Step S22).

In this manner, the system controller 105 and the engine 200 in the MFP 100 are connected to each other via the dedicated signal line 302 so that data can be transferred therebetween without establishing communication therebetween. Therefore, the MFP 100 can be switched to normal mode before the establishment of the communication between the system controller 105 and the engine 200. This reduces the reset time required to switch to normal mode when the MFP 100 is powered, which improves user-friendliness.

The dedicated signal line 302 includes the first signal line that conveys the mode signal to set the power mode to normal mode and the second signal line that conveys the mode signal to set the power mode to any of the power-saving modes. With this configuration, it is possible to determine whether the power mode is set to normal mode immediately after the MFP 100 is powered without performing the process for establishing communication. The dedicated signal line 302 further includes the third signal line that conveys the state signal indicative of the state of the engine 200. By using the third signal line, the process for establishing communication can be started by referring to the state of the engine 200, i.e., the process for establishing communication can be started without performing a protocol procedure.

According to an aspect of the present invention, the reset time is reduced, which improves user-friendliness of the image forming apparatus.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image forming apparatus, comprising:

a control unit configured to control operations of the image forming apparatus;

an engine unit configured to perform image formation under control of the control unit;

a universal transmission line that connects the control unit and the engine unit so that communication between the control unit and the engine unit can be established and data can be transferred between the control unit and the engine unit; and a dedicated transmission line that connects the control unit and the engine unit so that data can be transferred between the control unit and the engine unit even when communication has not been established between the control unit and the engine unit, wherein when the image forming apparatus is powered, the control unit sends a mode signal to the engine unit via the dedicated transmission line, wherein the mode signal is a signal indicative of whether a power mode is to be set to a normal mode where power is supplied to every component of the image forming apparatus, upon receiving the mode signal from the control unit via the dedicated transmission line, if the mode signal indicates that the power mode is to be set to the normal mode, the engine unit activates predetermined components in the image forming apparatus, after activation of the predetermined components, the control unit and the engine unit establish communication via the universal transmission line, after establishment of the communication, if the mode signal indicates that the power mode is to be set to a mode other than the normal mode, the control unit sends a setting command to the engine unit via the universal transmission line to set the power mode to a power-saving mode that is specified in the setting command from among a plurality of power-saving modes where power is supplied to only some components of the image forming apparatus, upon receiving the setting command from the control unit via the universal transmission line, the engine unit activates a part of the image forming apparatus so that the image forming apparatus switches to the power-saving mode that is specified by the setting command, the engine unit sends a state signal indicative of a state of the engine unit to the control unit via the dedicated transmission line, and upon receiving the state signal via the dedicated transmission line, if the state signal indicates that the engine unit is in a ready state for a process for establishing communication between the control unit and the engine unit, the control unit establishes communication with the engine unit via the universal transmission line.

2. The image forming apparatus according to claim 1, wherein, when the image forming apparatus is powered, the control unit determines using a signal that is received via the dedicated transmission line whether the power mode is to be set to the normal mode and generates the mode signal based on a result of the determination.

3. The image forming apparatus according to claim 1, wherein the predetermined components include one or more of a fixing device, components in a process system, and components in an optical system.

4. The image forming apparatus according to claim 3, wherein the dedicated transmission line includes a first transmission line that conveys the mode signal to set the power mode to the normal mode, a second transmission line that conveys the mode signal to set the power mode to any of the power-saving modes, and a third transmission line that conveys the state signal.

5. An image forming apparatus, comprising:

control means configured to control operations of the image forming apparatus;

engine means configured to perform image formation under control of the control means;

a universal transmission line that connects the control means and the engine means so that communication between the control means and the engine means can be established and data can be transferred between the control means and the engine means; and a dedicated transmission line that connects the control means and the engine means so that data can be transferred between the control means and the engine means even when communication has not been established between the control means and the engine means, wherein when the image forming apparatus is powered, the control means sends a mode signal to the engine means via the dedicated transmission line, wherein the mode signal is a signal indicative of whether a power mode is to be set to a normal mode where power is supplied to every component of the image forming apparatus, upon receiving the mode signal from the control means via the dedicated transmission line, if the mode signal indicates that the power mode is to be set to the normal mode, the engine means activates predetermined components in the image forming apparatus, after activation of the predetermined components, the control means and the engine means establish communication via the universal transmission line, after establishment of the communication, if the mode signal indicates that the power mode is to be set to a mode other than the normal mode, the control means sends a setting command to the engine means via the universal transmission line to set the power mode to a power-saving mode that is specified in the setting command from among a plurality of power-saving modes where power is supplied to only some components of the image forming apparatus, upon receiving the setting command from the control means via the universal transmission line, the engine means activates a part of the image forming apparatus so that the image forming apparatus switches to the power-saving mode that is specified by the setting command, the engine means sends a state signal indicative of a state of the engine means to the control means via the dedicated transmission line, and upon receiving the state signal via the dedicated transmission line, if the state signal indicates that the engine means is in a ready state for a process for establishing communication between the control means and the engine means, the control means establishes communication with the engine means via the universal transmission line.

6. The image forming apparatus according to claim 5, wherein, when the image forming apparatus is powered, the control means determines using a signal that is received via the dedicated transmission line whether the power mode is to be set to the normal mode and generates the mode signal based on a result of determination.

7. The image forming apparatus according to claim 5, wherein the predetermined components include one or more of a fixing device, components in a process system, and components in an optical system.

8. The image forming apparatus according to claim 7, wherein the dedicated transmission line includes a first transmission line that conveys the mode signal to set the power mode to the normal mode, a second transmission line that conveys the mode signal to set the power mode to any of the power-saving modes, and a third transmission line that conveys the state signal.

* * * * *